United States Patent
Radha Krishnan et al.

(10) Patent No.: US 11,995,395 B2
(45) Date of Patent: *May 28, 2024

(54) GENERATING MACHINE RENDERABLE REPRESENTATIONS OF FORMS USING MACHINE LEARNING

(71) Applicant: Intuit Inc., Mountain View, CA (US)

(72) Inventors: Vinoth Jeba Kumar Radha Krishnan, Bangalore (IN); Ganesh Bhat, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,768

(22) Filed: Jul. 29, 2022

(65) Prior Publication Data
US 2022/0391582 A1 Dec. 8, 2022

Related U.S. Application Data

(63) Continuation of application No. 16/940,604, filed on Jul. 28, 2020, now Pat. No. 11,436,407.

(51) Int. Cl.
*G06F 40/177* (2020.01)
*G06F 16/21* (2019.01)
*G06F 16/22* (2019.01)
*G06F 16/28* (2019.01)

(52) U.S. Cl.
CPC .......... *G06F 40/177* (2020.01); *G06F 16/212* (2019.01); *G06F 16/2264* (2019.01); *G06F 16/285* (2019.01)

(58) Field of Classification Search
None
See application file for complete search history.

(56) References Cited

U.S. PATENT DOCUMENTS

| | | |
|---|---|---|
| 2017/0075983 A1 | 3/2017 | Byron et al. |
| 2018/0239748 A1* | 8/2018 | Zhang .................. G06F 40/177 |
| 2018/0293511 A1 | 10/2018 | Bouillet et al. |
| 2019/0171704 A1 | 6/2019 | Buisson et al. |
| 2019/0303663 A1 | 10/2019 | Krishnapura Subbaraya et al. |
| 2020/0151272 A1 | 5/2020 | Freitag et al. |
| 2020/0175267 A1 | 6/2020 | Schafer et al. |
| 2020/0387553 A1 | 12/2020 | Tyulyaev et al. |

* cited by examiner

*Primary Examiner* — Howard Cortes
(74) *Attorney, Agent, or Firm* — Lathrop GPM LLP

(57) ABSTRACT

A method may include clustering form elements into line objects and columns of a table of a structured representation by applying a trained multi-dimensional clustering model to spatial coordinates of the form elements, and assigning a table header line type to a table header line object of the line objects based on a spatial coordinate of the table header line object relative to a spatial coordinate of a topmost table data line object of the line objects, and a determination that a number of columns of the table header line object is within a threshold of a number of columns of the topmost table data line object. The topmost table data line object may be assigned a table data line type. The method may further include presenting the structured representation to a user.

14 Claims, 9 Drawing Sheets

Document A
320

| | Name of corporation or fund | Number of shares or units | Acquisition date |
|---|---|---|---|
| | | | |
| | ATTG_10_COR1(0) | ATTG_10_SH1(1) | ATTG_10_Y1 |
| | ATTG_10_COR2(7) | ATTG_10_SH2(8) | ATTG_10_Y2 |
| | ATTG_10_COR3(14) | ATTG_10_SH3(15) | ATTG_10_Y3 |

Table Header Rows 322
Table Data Rows 324
Topmost Table Header Row 328
326A Column A
326B Column B
326C Column C

FIG. 3B

Document B
350

| In box 32010 of your federal Schedule 11. | | Column2 352A | Column1 352B | Column0 352C |
|---|---|---|---|---|
| Enter the number of months from box 24 of Form T2202 and column B of Forms TL11A and TL11C. | × $120 = | 59160 + | | 3 |
| Enter the number of months from box 25 of Form T2202 and column C of Forms TL11A and TL11C. | × $400 = | 59160 + | | 4 |
| Add lines 2, 3, and 4. | = Total 2019 tuition and education amounts | | ▲ + | 5 |
| Add lines 1 and 5. | Total available tuition and education amounts | | = | 6 |

FIG. 3C

Example of Un-Aligned Rows of Document Elements 370

GENERATING MACHINE RENDERABLE REPRESENTATIONS OF FORMS USING MACHINE LEARNING

RELATED APPLICATIONS

This application is a continuation application of U.S. application Ser. No. 16/940,604, filed Jul. 28, 2020, the entirety of which is hereby incorporated by reference.

BACKGROUND

Software applications may process a variety of online forms, such as compliance forms designed to comply with government regulations and into which users enter data. When compliance and other forms are modified, the online computer based forms are updated to reflect the changes. Often, the updates are performed by a human identifying the changes and coding the changes in the revised form. A capability to automatically process a form embodied in a document would be advantageous.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including clustering form elements into line objects and columns of a table of a structured representation by applying a trained multi-dimensional clustering model to spatial coordinates of the form elements, and assigning a table header line type to a table header line object of the line objects based on a spatial coordinate of the table header line object relative to a spatial coordinate of a topmost table data line object of the line objects, and a determination that a number of columns of the table header line object is within a threshold of a number of columns of the topmost table data line object. The topmost table data line object is assigned a table data line type. The method further includes presenting the structured representation to a user.

In general, in one aspect, one or more embodiments relate to a system including a computer processor and a data repository configured to store a structured representation including line objects and columns of a table. The system further includes a structured representation generator executing on the computer processor and configured to cluster form elements into the line objects and the columns of the table by applying a trained multi-dimensional clustering model to spatial coordinates of the form elements, and assign a table header line type to a table header line object of the line objects based on a spatial coordinate of the table header line object relative to a spatial coordinate of a topmost table data line object of the line objects, and a determination that a number of columns of the table header line object is within a threshold of a number of columns of the topmost table data line object. The topmost table data line object is assigned a table data line type. The structured representation generator is further configured to present the structured representation to a user.

In general, in one aspect, one or more embodiments relate to a method including clustering initial form elements into initial line objects and initial columns of an initial table of an initial structured representation by applying a trained multi-dimensional clustering model to initial spatial coordinates of the initial form elements. The initial structured representation has a structured representation type. The method further includes assigning a table header line type to an initial table header line object of the initial line objects based on a spatial coordinate of the initial table header line object relative to a spatial coordinate of an initial topmost table data line object of the initial line objects, and a determination that a number of columns of the initial table header line object is within a threshold of a number of columns of the initial topmost table data line object. The initial topmost table data line object is assigned a table data line type. The method further includes adding the initial structured representation to a data repository, and clustering next form elements into next line objects and next columns of a next table of a next structured representation by applying a trained multi-dimensional clustering model to next spatial coordinates of the next form elements. The next structured representation has the structured representation type. The method further includes assigning a table header line type to a next table header line object of the next line objects based on a spatial coordinate of the next table header line object relative to a spatial coordinate of a next topmost table data line object of the next line objects, and a determination that a number of columns of the next table header line object is within a threshold of a number of columns of the next topmost table data line object. The next topmost table data line object is assigned a table data line type. The method further includes determining that the initial structured representation and the next structured representation are different, and in response to determining that the initial structured representation and the next structured representation are different, replacing, in the data repository, the initial structured representation with the next structured representation.

Other aspects of the invention will be apparent from the following description and the appended claims.

BRIEF DESCRIPTION OF DRAWINGS

FIG. 3A, FIG. 3B, FIG. 3C, FIG. 3D, and FIG. 4 show examples in accordance with one or more embodiments of the invention.

DETAILED DESCRIPTION

Figure 1:
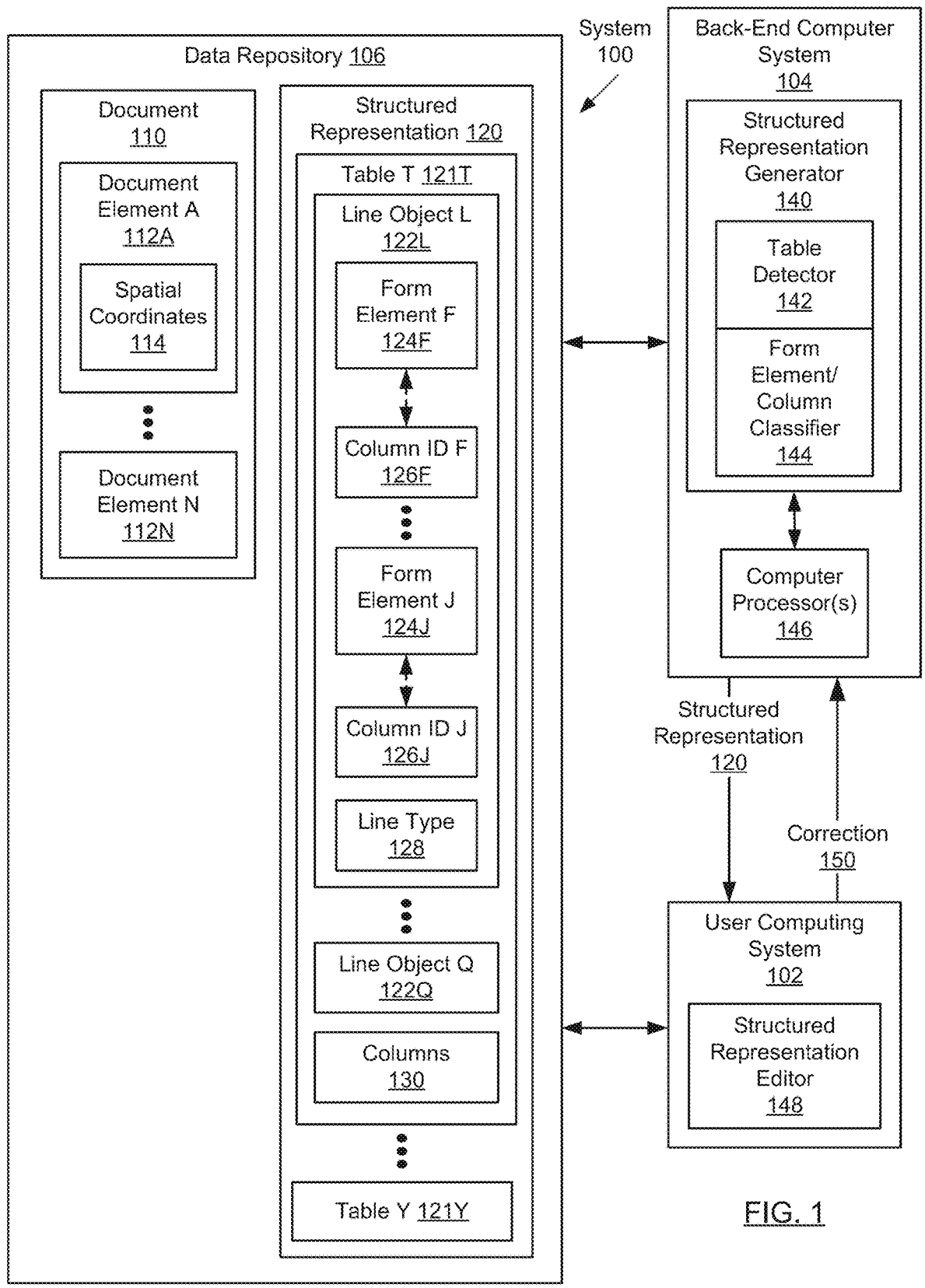
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Forms represented as machine-readable documents may have a variety of elements with visual relationships among the form elements. Providing a capability to systematically and reliably capture the visual relationships among the form elements may be challenging due to variations in the spatial layout of the machine-readable documents. Such relationships may include: 1) the spatial layout of form elements (e.g., fields) into rows and columns of tables, 2) the classification of particular rows into header rows vs. data rows, and 3) the alignment of form elements in different portions of a document into columns.

The disclosed invention combines machine learning algorithms and rules to provide the capability to systematically and reliably capture visual relationships among elements of forms represented as machine-readable documents. A trained multi-dimensional clustering model is applied to spatial coordinates of document elements to capture the layout of tabular data as rows and columns of a structured representation. A combination of rules may be used to classify table rows into header rows vs. data rows. The rules may be based on the spatial coordinates of candidate header rows relative to table data rows, as well as the number of columns in candidate header rows relative to table data rows. A trained classifier may be used to determine the alignment of form elements in different portions of a document. The trained multi-dimensional clustering model may be re-applied to adjust the structured representation in response to corrections received from a user. For example, the corrections may be received via a graphical user interface (GUI) that permits the user to edit the structured representation.

The aforementioned capability enables efficient, scalable processing and/or updating of forms represented as machine-readable documents. This capability is especially useful for forms that are periodically updated with new versions. The resulting structured representation may be used to drive a forms-based GUI usable by both end-users entering data into forms and/or by expert users editing the structured representation to provide added value.

FIG. 1 shows a diagram of a system (100) in accordance with one or more embodiments. As shown in FIG. 1, the system (100) includes multiple components such as the user computing system (102), a back-end computer system (104), and a data repository (106). Each of these components is described below.

In one or more embodiments, the user computing system (102) provides, to a user, a variety of computing functionality. For example, the computing functionality may include word processing, multimedia processing, financial management, business management, social network connectivity, network management, and/or various other functions that a computing device performs for a user. The user may be a small business owner. Alternatively, the user may be a company employee that acts as a sender, a potential sender, or a requestor of services performed by a company (e.g., a client, a customer, etc.) of the user computing system. The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) may take the form of the computing system (500) shown in FIG. 5A connected to a network (520) as shown in FIG. 5B.

The user computing system (102) includes a structured representation editor (148) in accordance with one or more embodiments. The structured representation editor (148) is a user interface (UI) (not shown) for receiving input from a user and transmitting output to the user. For example, the UI may be a graphical user interface or other user interface. The UI may be rendered and displayed within a local desktop software application or the UI may be generated by a remote web server and transmitted to a user's web browser executing locally on a desktop or mobile device.

Continuing with FIG. 1, the data repository (106) is any type of storage unit and/or device (e.g., a file system, database, collection of tables, or any other storage mechanism) for storing data. Further, the data repository (106) may include multiple different storage units and/or devices. The multiple different storage units and/or devices may or may not be of the same type or located at the same physical site. The data repository (106) may be accessed online via a cloud service (e.g., Amazon Web Services, Egnyte, Azure, etc.).

In one or more embodiments, the data repository (106) includes functionality to store a document (110) and a structured representation (120). A document (110) is any type of written matter that captures information. The document (110) may be represented as a file using the Portable Document Format (PDF), HyperText Markup Language (HTML), eXtensible Markup Language (XML), JavaScript Object Notation (JSON), or any other file format. For example, a document (110) may be or include one or more of a form, a spreadsheet, a presentation, a word processing application document, or other such document. By way of an example, the document (110) may be a compliance form (e.g., audit form, data security form, tax form, medical form, privacy policy, etc.) to be completed by a user, and designed to comply with the regulations of a government agency. For example, the compliance form may be specific to a jurisdiction (e.g., a geographic region such as a state, country, region, municipality, reinvestment zone, etc.).

The document (110) includes document elements (112A, 112N). A document element (112A) is a discrete visual component of the document (110) that is displayed when the document is displayed in a user interface. For example, a document element (112A) may be a chunk of text. Alternatively, a document element (112A) may be a shape (e.g., a line or rectangle), an image (e.g., a bitmap), etc. Continuing this example, a document element (112A) may be a rectangle or box that represents an input field. In one or more embodiments, a document element (112A) includes spatial coordinates (114) indicating the placement of the document element (112A) within the document (110). The placement may be expressed in terms of a region (e.g., a rectangle) in a coordinate system (e.g., Cartesian coordinates within the document (110)), where the region encompasses the document element (112A). In one or more embodiments, the placement may be used to calculate distances between document elements (112A, 112N). The document element (112A) may include additional attributes such as font, font size, number of characters (e.g., broken down into the number of numeric characters and the number of alphabetic characters), number of words, etc.

The document (110) may include a document type. The document type is a category that describes the document (110). For example, the document type may be a general category, such as tax document, payroll document, or legal document. Alternatively, the document type (114) may be a specific category, such as Schedule 1 of a Federal Tax Form, etc.

In one or more embodiments, the structured representation (120) is a schema for a form. The structured representation (120) is the output of embodiments of the invention. For example, the schema may be represented using JavaScript Object Notation (JSON) or eXtended Markup Language (XML). The structured representation (120) may include one or more tables (121T, 121Y). A table (121T) is a representation of information in terms of rows and columns. For example, a row (e.g., a record) may include one or more values corresponding to one or more columns. A table (121T) may include line objects (122L, 122Q) and columns (130). A line object (122L) is an instance of a row in a table (121T). A line object (122L) includes form elements (124F, 124J) and a line type (128). A form element (124F) is a component of the structured representation (120). The form element (124F) is a representation of a particular document element (112A) in a structural format. Thus, each form element corresponds to a particular document element. Examples of form elements (124F, 124J) may include line descriptions, line numbers, fields, field numbers, field descriptions, etc.

In one or more embodiments, a line object (122L) corresponds to a placement (e.g., a location) within the document (110). For example, a line object (122L) may correspond to a placement within the document (110) that is within a threshold distance of the placements (e.g., regions) of the document elements corresponding to the form elements included in the line object (122L). Continuing this example, the placement of a line object (122L) may be represented as a spatial coordinate (e.g., a y-coordinate) of the vertical axis of the document (110). Further continuing this example, the spatial coordinate may be represented as a horizontal line (e.g., the line defined by the equation "y=12") within a coordinate system of the document (110).

In one or more embodiments, columns (130) are vertical lines to which form elements in different line objects of the structured representation (120) are aligned. For example, the different line objects in the same column may be in the same table or in different tables. Each of the columns (130) may be a vertical line defined using a spatial coordinate (114) (e.g., an x-coordinate) of the horizontal axis of the document (110) corresponding to the structured representation (120). For example, the vertical line may be defined by the equation "x=3" within a coordinate system of the document. In one or more embodiments, one or more form elements of a line object (122L) (e.g., form elements (124F, 124J)) are assigned column IDs (126F, 126J) each identifying one of the columns (130). For example, a line object may include a first form element that is assigned column ID "column1" and a second form element that is assigned column ID "column4". The column IDs (126F, 126J) may correspond to the spatial coordinates (114) of the columns (130). For example, if N is the number of columns, then the column ID corresponding to the column with the largest x-coordinate may be "column0", the column ID corresponding to the column with the next largest x-coordinate may be "column1", etc., and the column ID corresponding to the column with the smallest x-coordinate may be "columnN". For example, see the columns (352A, 352B, 352C) in FIG. 3C.

The line type (128) is a category that describes the corresponding line object (122L). For example, the line type (128) may be "table header" when the line object corresponds to a line in a header of a table (121T). Continuing this example, a line object with line type (128) "table header" may describe the type of data contained in the table (121T). Alternatively, the line type (128) may be "table data" when the line object (122L) corresponds to a line of data (e.g., a record) in the table (121T). As another example, the line type (128) may be "form header" when the line object corresponds to a line in a header of a form represented in the document (110) corresponding to the structured representation (120). The structured representation generator (140) includes functionality to assign a line type (128) to a line object (122L).

The structured representation (120) may include a structured representation type. The structured representation type is a category that describes the structured representation (120). The structured representation type may correspond to the document type of the document (110) corresponding to the structured representation (120).

Continuing with FIG. 1, the back-end computer system (104) is communicatively connected to the user computing system (102) such as through one or more networks. The back-end computer system (104) includes a structured representation generator (140) and computer processor(s) (146). The structured representation generator (140) includes a table detector (142) and a form element/column classifier (144). The table detector (142) may be implemented as a multi-dimensional clustering model that includes functionality to cluster form elements into line objects (122L, 122Q). The multi-dimensional clustering model may be implemented using a variety of techniques (e.g., k-means clustering, centroid-based clustering, hierarchical clustering, distribution-based clustering, density-based clustering, naïve Bayes, etc.).

Figure 3A:
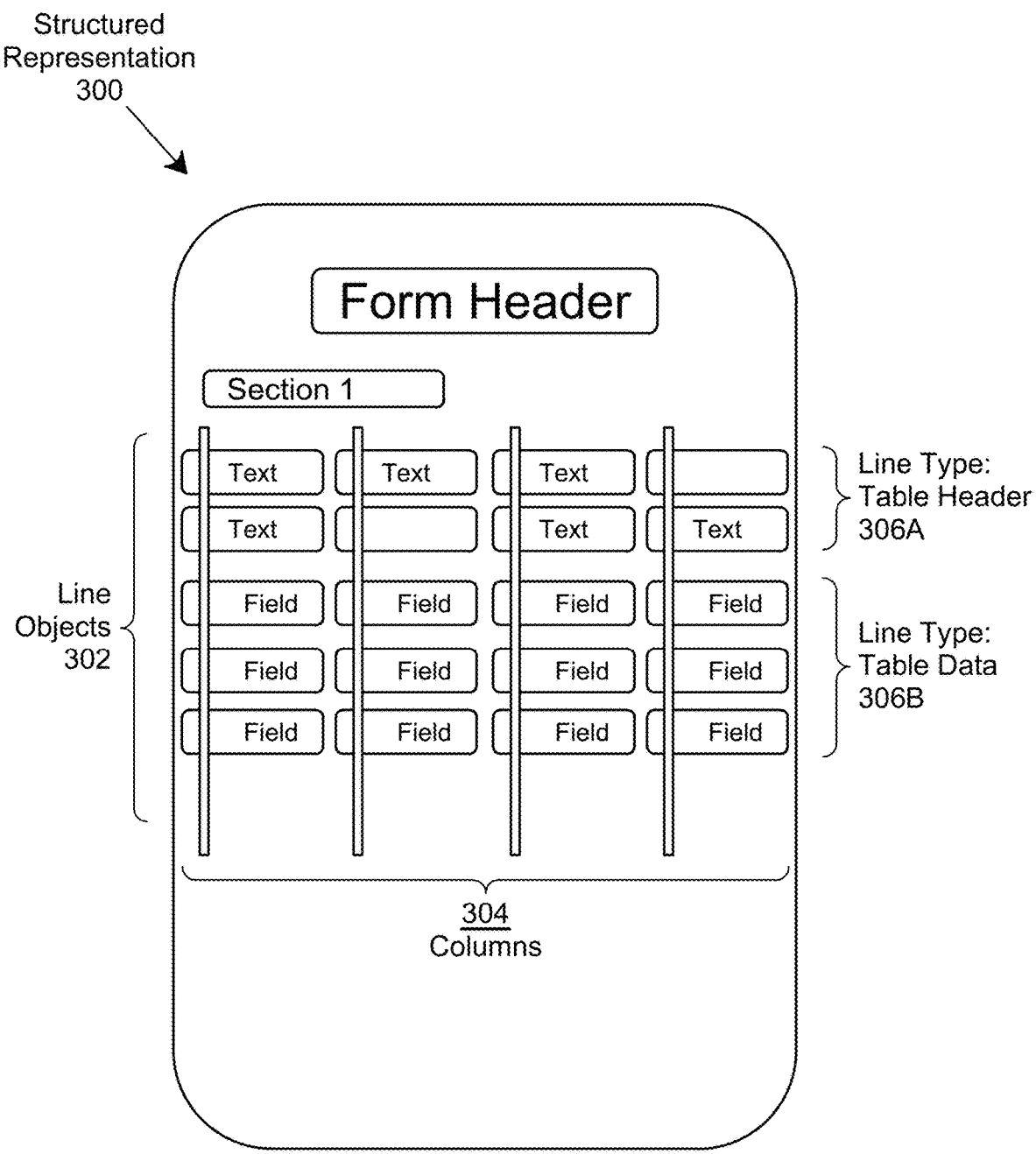
Figure 3D:
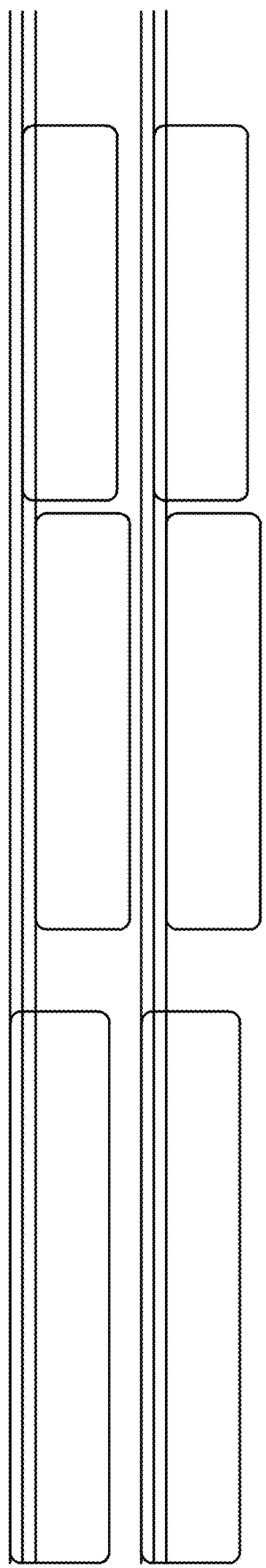

The multi-dimensional clustering model may perform the clustering into line objects (122L, 122Q) using a distance measure based on spatial coordinates (114) of the document elements corresponding to the form elements. For example, the distance measure may be a Cartesian distance between the y-coordinates of the document elements corresponding to the form elements. Continuing this example, form elements (124F, 124J), whose corresponding document elements are within a threshold distance of each other, may be clustered into a single line object (122L). Further continuing this example, the single line object (122L) may correspond to specific spatial coordinates (e.g., a y-coordinate). Still further continuing this example, the document elements may also be within a threshold distance of a placement within the document (110) that corresponds to the line object (122A). The multi-dimensional clustering model may be trained to cluster form elements (124F, 124J) into a line object (122A) with a high degree of accuracy despite variations in the spatial coordinates and/or sizes of documents elements. In other words, the rows of document elements may not be horizontally aligned, as shown in the example of un-aligned rows of document elements (370) in FIG. 3D. FIG. 3D shows two rows of document elements, where each row of document elements is not horizontally aligned. In FIG. 3D, the document elements are represented as ovals. For each row shown in FIG. 3D, the three horizontal lines at the tops of the ovals show that the document elements within the same row are not horizontally aligned.

Similarly, the multi-dimensional clustering model includes functionality to cluster form elements into columns (130). The multi-dimensional clustering model may perform the clustering into columns (130) using a distance measure based on spatial coordinates (114) of document elements corresponding to the form elements. For example, the distance measure may be based on a Cartesian distance between the x-coordinates of the document elements corresponding to the form elements. Continuing this example, form elements whose corresponding document elements are within a threshold distance of each other may be clustered in the same column (130). Further continuing this example, the document elements may also be within a threshold distance of a placement within the document (110) that corresponds to the column (130). Still further continuing this example, the placement may be defined as a vertical line (e.g., a x-coordinate) within the document (110).

In one or more embodiments, the form element/column classifier (144) includes functionality to assign column IDs (126F, 126J) to form elements (124F, 124J). In one or more embodiments, the form element/column classifier (144) is implemented using a decision tree classifier that performs multi-class classification, where the multiple classes are different column IDs. In one or more embodiments, the internal nodes of the decision tree are spatial coordinates (e.g., x-coordinates) of a training data set of document elements, and the leaf nodes are column IDs. As a default, the decision tree classifier may return, for a given document element, the column ID with the highest probability. The decision tree classifier may be primarily used to classify document elements into column IDs that are typically not part of a table. For example, the leftmost columns of a document are typically not part of a table. Alternatively, the form element/column classifier (144) may be implemented by any other type of classifier, such as k-nearest neighbors. The decision tree classifier may be trained using documents whose document elements are labeled with spatial coordinates and column IDs. The column IDs may identify columns that correspond to vertical lines in the document. The form element/column classifier (144) may perform the assignment of column IDs (126F, 126J) to form elements (124F, 124J) using a distance measure based on the spatial coordinates of the document elements corresponding to the form elements, as well as the spatial coordinates of the columns.

The structured representation generator (140) may include one or more element classification models (e.g., supervised machine learning models) with functionality to assign an element type to a document element (112A). The form element corresponding to the document element (112A) may inherit the assigned element type. Examples of element types may include: descriptive text, header, input field, line number, etc. For example, a first element classification model may classify a first document element as "descriptive text", a second element classification model may classify a second document element as a "line number", and a third element classification model may classify a third document element as an "input field". The element classification models may be trained using document elements labeled as various types of elements. An element classification model may be implemented as a classifier using XGBoost (available at https://github.com/dmlc/xgboost). Alternatively, an element classification models may be implemented as a k-nearest neighbor (k-NN) classifier. Still alternatively, an element classification model may be implemented as a deep learning classifier, such as a neural network classifier (e.g., based on convolutional neural networks (CNNs)), random forest classifier, SGD classifier, lasso classifier, gradient boosting classifier, bagging classifier, ada boost classifier, ridge classifier, elastic net classifier, or NuSVR classifier. Deep learning, also known as deep structured learning or hierarchical learning, is part of a broader family of machine learning methods based on learning data representations, as opposed to task-specific algorithms.

Continuing with FIG. 1, the structured representation editor (148) includes functionality to receive a structured representation (120) from the structured representation generator (140). The structured representation editor (148) includes functionality to present the structured representation (120) to a user. The structured representation editor (148) includes functionality to receive, from the user, one or more corrections (150) to the structured representation (120). A correction (150) may modify a line type (128) of a line object (122L) of the structured representation (120). For example, a correction (150) may change a line type (128) of a line object (122L) from "table data" to "table header", or vice versa. Alternatively, a correction (150) may modify an assignment of a column ID (126F) to a form element (124F) of a line object (122L). The structured representation editor (148) includes functionality to send the one or more corrections (150) to the structured representation generator (140).

In one or more embodiments, the computer processor(s) (146) takes the form of the computer processor(s) (502) described with respect to FIG. 5A and the accompanying description below. The computer processor (146) includes functionality to execute the structured representation generator (140).

While FIG. 1 shows a configuration of components, other configurations may be used without departing from the scope of the invention. For example, various components may be combined to create a single component. As another example, the functionality performed by a single component may be performed by two or more components.

Figure 2A:
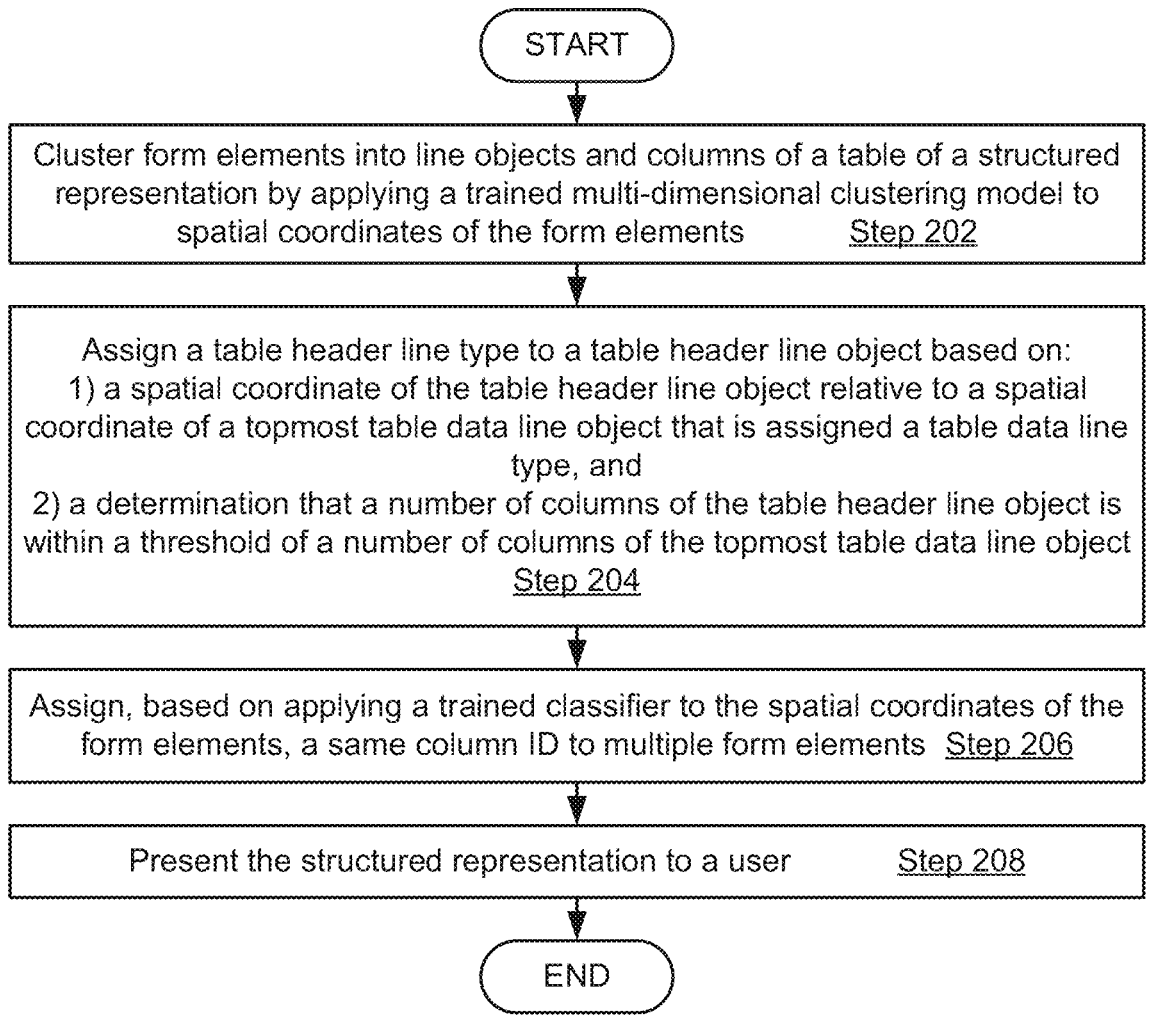
FIG. 2A and FIG. 2B show flowcharts in accordance with one or more embodiments of the invention.

FIG. 2A shows a flowchart in accordance with one or more embodiments of the invention. The flowchart depicts a process for process for generating a structured representation of a form. One or more of the steps in FIG. 2A may be performed by the components (e.g., the structured representation generator (140) of the back-end computing system (104) and the structured representation editor (148) of the user computing system (102)), discussed above in reference to FIG. 1. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, form elements are clustered into line objects and columns of a table of a structured representation by applying a trained multi-dimensional clustering model to spatial coordinates of the form elements. The structured representation generator may obtain the form elements as follows. First, the structured representation generator may obtain a document (e.g., from a data repository). The structured representation generator may obtain, from the document, document elements and spatial coordinates indicating the placement of each document element within the document. For example, the structured representation generator may obtain the document elements and the spatial coordinates from the document using a software tool. Continuing this example, the structured representation generator may use a PDF mining tool to extract, from a document represented in PDF, the document elements and the spatial coordinates. Alternatively, the structured representation generator may obtain the document elements and the spatial coordinates from a marked up version of the document. For example, the marked up version of the document may be represented in a machine-readable format, such as JavaScript Object Notation (JSON). The structured representation generator may convert the document elements to form elements using the spatial coordinates of the document elements. For example, the structured representation generator may assign the spatial coordinates of each form element to be the spatial coordinates of the corresponding document element.

The multi-dimensional clustering model may cluster form elements into line objects of the table using a distance measure based on the y-coordinates of the form elements. The multi-dimensional clustering model may cluster form elements into columns using distances based on the x-coordinates of the form elements. The multi-dimensional clustering may correctly identify the line objects and columns even in tables with holes in the line objects and/or columns. For example, a line object with a hole lacks a value for one or more columns. Similarly, a column with a hole lacks a value for one or more line objects.

In addition to applying the trained multi-dimensional clustering model, the structured representation generator may use one or more rules (e.g., heuristics) to cluster line objects into tables. For example, a rule may specify that a line object is part of a table when the number of user-enterable form elements of the line object exceeds a threshold.

In Step 204, a table header line type is assigned to a table header line object. In one or more embodiments, the structured representation generator first identifies line objects of the table that are candidate table header line objects (i.e., line objects that are candidates to be assigned the line type "table header"). The structured representation generator may identify a set of candidate table header line objects using one or more rules. For example, one rule may be: a candidate table header line object contains text only (e.g., a candidate table header line object does not accept user-entered input). In contrast, the structured representation generator may identify line objects of the table that are candidate table data line objects (i.e., candidate line objects to be assigned the line type "table data") using the following rule: a line object that accepts user-entered input may be a table data line object. As another example, the structured representation generator may identify a candidate form header line object using the following rule: a line object containing text whose size exceeds the size of text in any other line object in the structured representation may be assigned the line type "form header".

Once the candidate table header line objects are identified, the structured representation generator may assign the line type "table header" to a subset of the candidate table header line objects based on the following:

1) a spatial coordinate of the candidate table header line object relative to a spatial coordinate of a topmost table data line object, where the topmost table data line object is assigned the line type "table data". For example, the spatial coordinate of the candidate table header line object may be within a threshold distance of the spatial coordinate of the topmost table data line object. Continuing this example, the spatial coordinate of the candidate table header line object may be a y-coordinate corresponding to the table header line object and the spatial coordinate of the topmost table data line object may be a y-coordinate corresponding to the topmost table data line object. The topmost table data line object may be a line object whose y-coordinate is the smallest in the cluster of line objects of the table.

2) a determination that a number of columns of the candidate table header line object is within a threshold of a number of columns of the topmost table data line object. For example, the candidate table header line object may have the same number of columns as the topmost table data line object. As another example, the difference between the number of columns in the candidate table header line object and the number of columns in the topmost table data line object may be within a threshold of two. As an example, in FIG. 3B, although the bottom two of the table header rows (322), as well as each of the table data rows (324), each have three columns, the topmost table header row (328) has only a single column.

In Step 206, a same column ID is assigned to a first form element in a first line object and a second form element in a second line object based on applying a trained classifier to the spatial coordinates of the form elements. The same column ID identifies a column in the table. The trained classifier may align form elements in different line objects to the same column despite variations in the placement (e.g., variations in the x-coordinates) of document elements corresponding to the form elements. For example, the x-coordinates of document elements on different lines of a document may not be aligned, even though the document elements may be intended to be aligned in the same column. In addition, the x-coordinates of document elements of different documents may vary. In contrast, rule-based approaches to assigning column IDs to form elements in the presence of such variations may not be as reliable as using a trained classifier.

In one or more embodiments, the different line objects are in different tables. For example, the document elements of the document corresponding to the form elements of the structured representation may be arranged such that the columns to which the document elements are aligned are "global" columns spanning multiple tables.

In Step 208, the structured representation is presented to a user. The structured representation may be presented to the user via a structured representation editor. The structured representation editor may receive the structured representation from the structured representation generator. The structured representation editor may receive, from the user, one or more corrections to the structured representation. That is, the structured representation generated by Step 202, Step 204, and Step 206 above may contain errors, which may be corrected by a user. A correction may modify a line type of a line object of the structured representation. For example, a correction may change a line type of a line object from "table data" to "table header". Alternatively, a correction may modify an assignment of a column ID to a form element of a line object. Still alternatively, a correction may modify an element type assigned to a form element.

The table below shows an example of a structured representation as presented to a user via a structured representation editor with a graphical user interface (GUI). The structured representation includes the line type assigned to each line object. For example, the line type of the line objects on line numbers 6, 7, 8, and 13 is "table header", and the line type of the line objects on line numbers 14, 15, 22, and 23 is "table data". The user may correct the line type assigned to any of the line objects by selecting a line type from a drop-down menu that includes a list of valid line types.

| Line # | Form Elements | Line Type |
|---|---|---|
| 0 | Name: SIN: Printed: 22 Nov. 2019 | Line: GeneralText |
| 1 | Protected B when completed | Line: GeneralText |
| 2 | T1-2019 Schedule 3 | Line: GeneralText |
| 3 | Capital Gains (or Losses) in 2019 | Line: Heading |
| 4 | Complete this Schedule and attach it to your return to report your capital gains (or losses) on lin 12700 of your return | Line: GeneralText |
| 5 | For more information. See Guide T4037, Capital Gains. If you need more space, attach a separate sheet. | Line: GeneralText |
| 6 | Note: if you have a business (1) (2) (3) (4) (5) | Line: TableHeader |
| 7 | investment loss, see Year of Proceeds of Adjusted Outlays & Expenses Gain | Line: TableHeader |
| 8 | Guide T4037. acquisition Disposition Cost base (from dispositions) (or loss) | Line: TableHeader |
| 9 | 1. Qualified small business corporation shares (If you realized a gain on a disposition, you may be able to claim a capital gains | Line: GeneralText |
| 10 | deduction on line 25400 of your return.) | Line: GeneralText |
| 11 | (Report, in section 3 below, publicly traded shares, mutual fund units, deferral of eligible small business corporation | Line: GeneralText |
| 12 | Shares, and other shares.) | Line: GeneralText |
| 13 | Number Name of corp. and class of shares | Line: TableHeader |
| 14 | S3_107_SH1(0) 0 S3_107_COR1(1) 1 S3_107_Y1(2) 2 S3_107_PRO1(3) 3 S3_107_CST1(4) 4 S3_107_EXP1(5) 5 S3_107_NET1(6) 6 | Line: TableData |
| 15 | S3_107_SH2(7) 0 S3_107_COR2(8) 1 S3_107_Y2(9) 2 S3_107_PRO2(10) 3 S3_107_CST2(11) 4 S3_107_EXP2(12) 5 S3_107_NET2(13) 6 | Line: TableData |
| 16 | NOID(14) From information slips S3_107_ISL(15) | Line: OneColumnField |
| 17 | Total 10699 S3_106(16) Gain (or loss) 10700 S3_107(17) | Line: TwoColumnFields |
| 18 | 2. Qualified farm or fishing property (If you realized a gain on a disposition, you may be able to claim a capital gains deduction | Line: GeneralText |
| 19 | On line 25400 of your return.) | Line: GeneralText |
| 20 | Prov./ | Line: GeneralText |
| 21 | Address or legal description Terr. | Line: GeneralText |
| 22 | S3_110_ADD1(18) 0 S3_110_PROV_1(19) 1 S3_110_Y1(20) 2 S3_110_PRO1(21) 3 S3_110_CST1(22) 4 S3_110_EXP1(23) 5 S3_110_NET1(24) 6 | Line: TableData |
| 23 | S3_110_ADD2(25) 0 S3_110_PROV_2(26) 1 S3_110_Y2(27) 2 S3_110_PRO2(28) 3 S3_110_CST2(29) 4 S3_110_EXP2(30) 5 S3_110_NET2(31) 6 | Line: TableData |
| 24 | NOID(32) From information slips S3_110_ISL(33) | Line: OneColumnField |
| 25 | Total 10999 S3_109(34) Gain (or loss) 11000 S3_110(35) | Line: TwoColumnFields |

In response to receiving the correction, the structured representation generator may repeat Step 202 above to re-cluster the form elements into line objects and columns by repeating the application of the trained multi-dimensional clustering model to the spatial coordinates of the form elements. In response to receiving the correction, the structured representation generator may repeat Step 204 above to modify the line type of a line object. For example, the correction may change the topmost table data line object, which may change the set of candidate table header line objects. Continuing this example, repeating Step 204 may re-assign the form elements in the new table header line objects to different columns. In addition, the correction may be used as additional training data to retrain the trained multi-dimensional clustering model.

Figure 2B:
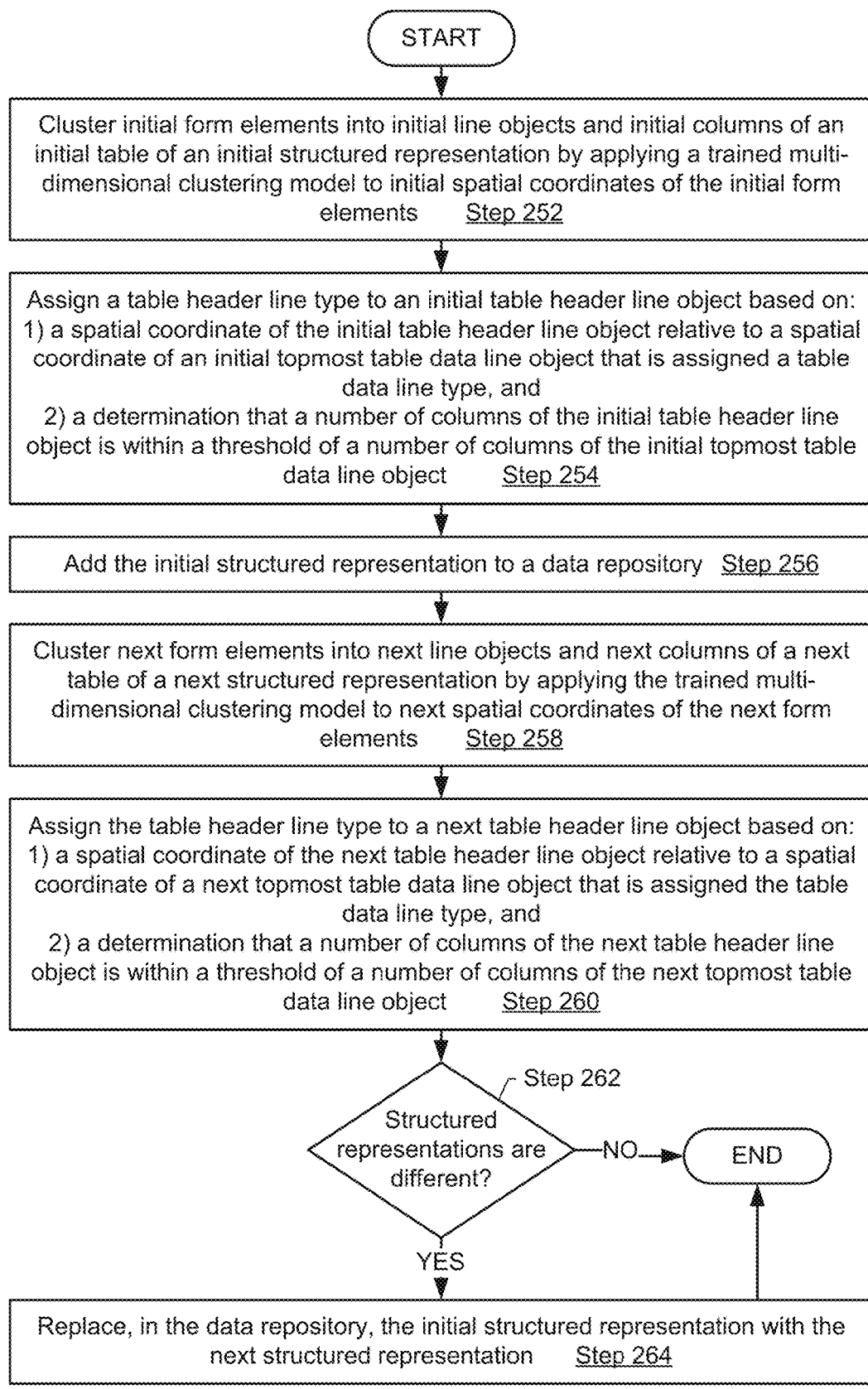

FIG. 2B shows a flowchart in accordance with one or more embodiments of the invention. The flowchart depicts a process for process for generating a structured representation of a form. One or more of the steps in FIG. 2B may be performed by the components (e.g., the structured representation generator (140) of the back-end computing system (104) and the structured representation editor (148) of the user computing system (102)), discussed above in reference to FIG. 1. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, initial form elements are clustered into initial line objects and initial columns of a table of an initial structured representation by applying a trained multi-dimensional clustering model to initial spatial coordinates of the initial form elements (see description of Step 202 above). The initial structured representation may have a structured representation type.

In Step 254, a table header line type is assigned to an initial table header line object. In one or more embodiments, the structured representation generator first identifies line objects of the table that are candidate initial table header line objects (see description of Step 204 above). Once the candidate initial table header line objects are identified, the structured representation generator may assign the line type "table header" to a subset of the candidate initial table header line objects based on 1) and 2) as described in Step 204 above.

In Step 256, the initial structured representation is added to a data repository. In one or more embodiments, the data repository serves as a knowledge base of structured representations. In one or more embodiments, the structured representations included in the repository may be accessed (e.g., queried) using the structured representation type.

In Step 258, next form elements are clustered into next line objects and next columns of a table of a next structured representation by applying the trained multi-dimensional clustering model to next spatial coordinates of the next form elements (see description of Step 202 above). The next structured representation may have the structured representation type. For example, the next structured representation may be a later version of the initial structured representation.

In Step 260, a table header line type is assigned to a next table header line object. In one or more embodiments, the structured representation generator first identifies line objects of the table that are candidate next table header line objects (see description of Step 204 above). Once the candidate next table header line objects are identified, the structured representation generator may assign the line type "table header" to a subset of the candidate next table header line objects based on 1) and 2) as described in Step 204 above.

If, in Step 262, a determination is made that the initial structured representation and the next structured representation are different, then Step 264 below is executed. In one or more embodiments, the initial structured representation and the next structured representation are different when at least one of the following is true:
1) the number of columns of the initial table and the number of columns of the next table are different,
2) the difference between the x-coordinates of corresponding columns (e.g., the rightmost columns) of the initial table and the next table exceeds a threshold,
3) the number of line objects in the initial table assigned the table header line type and the number of line objects in the next table assigned the table header line type are different,
4) the number of line objects in the initial table assigned the table data line type and the number of line objects in the next table assigned the table data line type are different, or
5) the column ID of a form element in the initial table differs from the column ID of the corresponding form element in the next table (e.g., the corresponding form element in the next table may be a form element with the same text content as the form element in the initial table).

In Step 264, the initial structured representation is replaced with the next structured representation in the data repository. For example, the next structured representation may representation an updated version of the initial structured representation. Alternatively, the next structured representation may be a version of the initial structured representation that is adapted to a jurisdiction different from a jurisdiction corresponding to the initial structured representation.

The following examples are for explanatory purposes only and not intended to limit the scope of the invention. FIG. 3A shows a schematic diagram of a structured representation (300) ((120) in FIG. 1) for a table that includes line objects (302) ((122L, 122Q) in FIG. 1) and columns (304) ((130) in FIG. 1). Each of the line objects (302) includes a cluster of form elements. Similarly, each of the columns (304) includes a cluster of form elements. FIG. 3A shows that the two uppermost line objects have line type "table header" (306A) ((128) in FIG. 1) and contain form elements with element type "text". Both of the line objects with line type "table header" (306A) include a "hole" due to the absence of a value in one of the columns. The three lowermost line objects have line type "table data" (306B) and contain form elements with element type "field" (e.g., an input field that accepts user-enterable data). FIG. 3A also shows "holes" in two of the columns due to the absence of a value in each of the line objects with line type "table header" (306A).

FIG. 3B shows a portion of a document (320) ((110) in FIG. 1) including a table that includes table header rows (322), table data rows (324), and columns (326A, 326B, 326C). The structured representation generator initially fails to assign the topmost table header row (328) a line type of "table header". After presenting the structured representation generated from the document (320) to a user, the structured representation generator receives a correction from the user indicating that the line type of the topmost table header row (328) should be changed to "table header". The structured representation generator then re-applies, using the correction, the multi-dimensional clustering model to the form elements of the structured representation and determines that the topmost table header row (328) has a value for column B (326B) but lacks values for column A (326A) and column C (326C). Thus, the structured representation generator assigns the column ID "columnB" to the form element (i.e., the form element labeled "Number of") in the topmost table header row (328).

FIG. 3C shows a portion of a document (350) including document elements that are aligned into columns (352A, 352B, 352C) even though the document elements are not part of a table. As described earlier, FIG. 3D shows an example of un-aligned rows of document elements (370).

Figure 4:
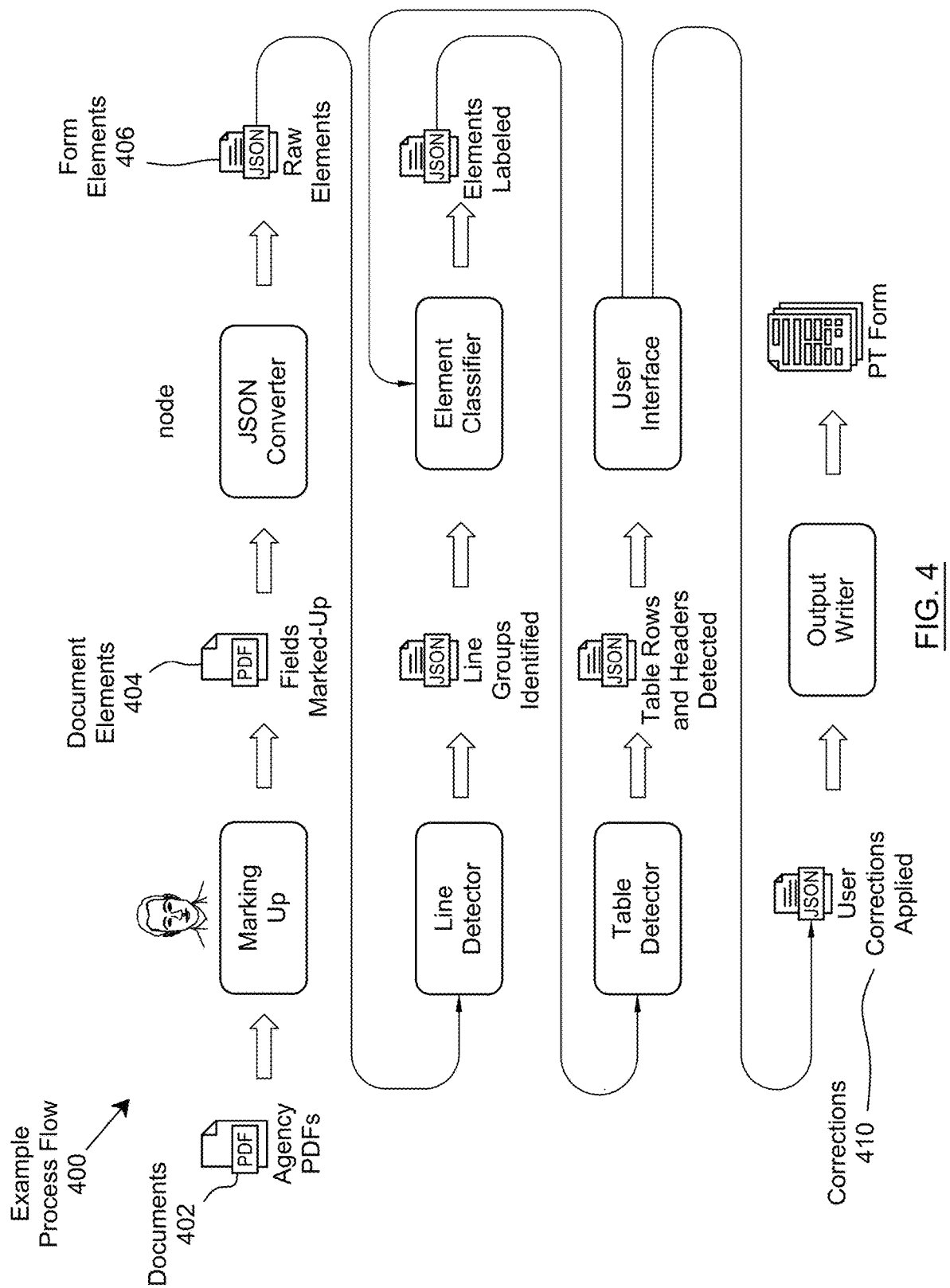

FIG. 4 shows an example process flow (400) for generating a structured representation. Initially, document elements (404) are obtained from documents (402). The document elements (404) are then converted to form elements (406) ((124F, 124J) in FIG. 1) of a structured representation. In this case, the structured representation is represented using the JavaScript Object Notation (JSON) format. A "line detector" of the structured representation generator clusters the form elements (406) into line objects. Then, the form element/column classifier of the structured representation generator assigns column IDs to the form elements (406). In addition, element classification models of the structured representation generator assign an element type to the form elements (406). Next, the table detector of the structured representation generator assigns a line type to each of the line objects.

Then, the structured representation editor presents the structured representation to a user via a graphical user interface (GUI). The structured representation editor receives corrections (410) ((150) in FIG. 1) to the structured representation from the user. Then the structured representation generator re-clusters, using the corrections (410), the form elements (406) into line objects. The structured representation is then used in a forms-based GUI. For example, the forms-based GUI may be used by an expert user to add additional form elements to the structured representation. Continuing this example, the additional form elements may provide additional instructions and/or explanations relating to form elements that accept user-entered input (e.g., form elements that are assigned the element type "input field").

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5A:
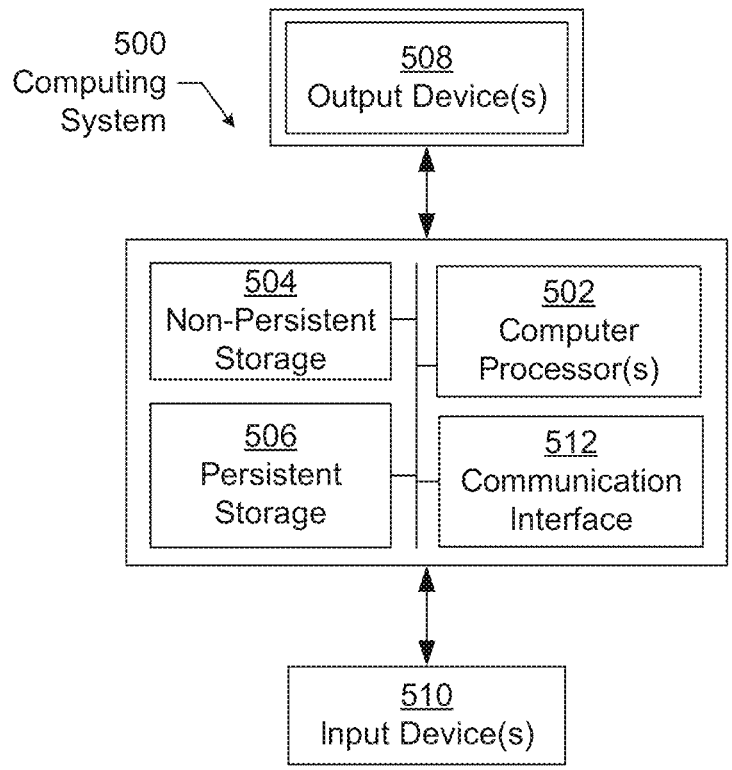
FIG. 5A and FIG. 5B show computing systems in accordance with one or more embodiments of the invention.
Figure 5B:
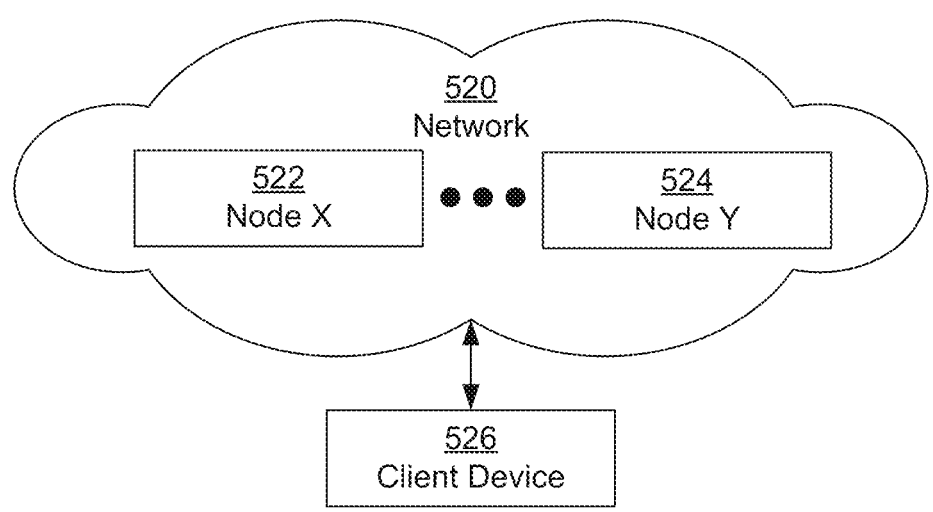

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    clustering a plurality of form elements into a plurality of line objects and a plurality of columns of a table of a structured representation by applying a trained multi-dimensional clustering model to a plurality of spatial coordinates of the plurality of form elements,
        wherein the clustering comprises:
            in response to a distance between a first document element, corresponding to a first form element of the plurality of form elements, a second document element, corresponding to a second form element of the plurality of form elements, being within a threshold distance, clustering the first form element and the second form element into a same line object of the plurality of line objects;
        assigning a table header line type to a table header line object of the plurality of line objects based on:
            a spatial coordinate of the table header line object relative to a spatial coordinate of a topmost table data line object of the plurality of line objects, wherein the topmost table data line object is assigned a table data line type, and
            a determination that a number of columns of the table header line object is within a threshold of a number of columns of the topmost table data line object; and
    presenting the structured representation to a user.

2. The method of claim 1, wherein the plurality of line objects comprises a first line object and a second line object, and wherein the plurality of form elements comprises a first form element in the first line object and a second form element in the second line object, the method further comprising:
    assigning, based on applying a trained classifier to the plurality of spatial coordinates of the plurality of form elements, a same column ID to the first form element and the second form element, wherein the same column ID identifies a column of the plurality of columns.

3. The method of claim 1, further comprising:
    receiving a correction to the structured representation from the user;
    modifying the structured representation by re-clustering the plurality of form elements using the correction; and
    retraining the trained multi-dimensional clustering model using the correction.

4. The method of claim 3,
    wherein the correction modifies a line type of a line object in the plurality of line objects, and
    wherein modifying the structured representation further comprises assigning, in the structured representation, the modified line type to the line object.

5. The method of claim 1, further comprising
    obtaining a plurality of document elements from a document; and
    converting the plurality of document elements to the plurality of form elements, wherein the plurality of spatial coordinates of the plurality of form elements match a plurality of spatial coordinates describing placement of the plurality of document elements within the document.

6. The method of claim 1, wherein applying the trained multi-dimensional clustering model to the spatial coordinates of the plurality of form elements comprises:
    identifying the first form element of the plurality of form elements that corresponds to the first document element of a plurality of document elements;
    identifying the second form element of the plurality of form elements that corresponds to the second document element of the plurality of document elements; and
    calculating the distance between the first document element and the second document element using the spatial coordinates corresponding to the first document element and the spatial coordinates corresponding to the second document element.

7. The method of claim 1, further comprising:
    assigning a table data line type to a subset of the plurality of line objects, wherein the subset comprises the topmost table data line object; and
    determining at least one spatial coordinate for at least one of the plurality of line objects.

8. A system, comprising:
    a computer processor;
    a data repository configured to store a structured representation comprising a plurality of line objects and a plurality of columns of a table; and
    a structured representation generator, executing on the computer processor and configured to:
        cluster a plurality of form elements into the plurality of line objects and the plurality of columns of the table by applying a trained multi-dimensional clustering model to a plurality of spatial coordinates of the plurality of form elements,
            wherein the clustering comprises:
                in response to a distance between a first document element, corresponding to a first form element of the plurality of form elements, a second document element, corresponding to a second form element of the plurality of form elements, being within a threshold distance, clustering the first form element and the second form element into a same line object of the plurality of line objects,
        assign a table header line type to a table header line object of the plurality of line objects based on:
            a spatial coordinate of the table header line object relative to a spatial coordinate of a topmost table data line object of the plurality of line objects, wherein the topmost table data line object is assigned a table data line type, and a determination that a number of columns of the table header line object is within a threshold of a number of columns of the topmost table data line object, and present the structured representation to a user.

9. The system of claim 8, wherein the plurality of line objects comprises a first line object and a second line object, wherein the plurality of form elements comprises a first form element in the first line object and a second form element in the second line object, and wherein the structured representation generator is further configured to:

assign, based on applying a trained classifier to the plurality of spatial coordinates of the plurality of form elements, a same column ID to the first form element and the second form element, wherein the same column ID identifies a column of the plurality of columns.

10. The system of claim 8, wherein the structured representation generator is further configured to:

receive a correction to the structured representation from the user;

modify the structured representation by re-clustering the plurality of form elements using the correction; and retrain the trained multi-dimensional clustering model using the correction.

11. The system of claim 10, wherein the correction modifies a line type of a line object in the plurality of line objects, and wherein modifying the structured representation further comprises assigning, in the structured representation, the modified line type to the line object.

12. The system of claim 9, wherein the structured representation generator is further configured to:

obtain a plurality of document elements from a document; and convert the plurality of document elements to the plurality of form elements, wherein the plurality of spatial coordinates of the plurality of form elements match a plurality of spatial coordinates describing placement of the plurality of document elements within the document.

13. The system of claim 8, wherein applying the trained multi-dimensional clustering model to the spatial coordinates corresponding to a plurality of document elements comprises:

identifying the first form element of the plurality of form elements that corresponds to the first document element of the plurality of document elements;

identifying the second form element of the plurality of form elements that corresponds to the second document element of the plurality of document elements; and calculating the distance between the first document element and the second document element using the spatial coordinates corresponding to the first document element and the spatial coordinates corresponding to the second document element.

14. The system of claim 8, wherein the structured representation generator is further configured to:

assign a table data line type to a subset of the plurality of line objects, wherein the subset comprises the topmost table data line object; and determine at least one spatial coordinate for at least one of the plurality of line objects.

\* \* \* \* \*